(12) United States Patent
Stefanatos et al.

(10) Patent No.: US 12,439,451 B2
(45) Date of Patent: Oct. 7, 2025

(54) LBT PROCEDURE FOR SIDELINK OPERATIONS IN UNLICENSED BANDS

(71) Applicant: QUALCOMM Incorporated, San Diego, CA (US)

(72) Inventors: Stelios Stefanatos, San Diego, CA (US); Shuanshuan Wu, San Diego, CA (US); Arthur Gubeskys, San Diego, CA (US); Parisa Cheraghi, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 18/027,050

(22) PCT Filed: Nov. 3, 2021

(86) PCT No.: PCT/US2021/057922
§ 371 (c)(1),
(2) Date: Mar. 17, 2023

(87) PCT Pub. No.: WO2022/103637
PCT Pub. Date: May 19, 2022

(65) Prior Publication Data
US 2023/0328777 A1    Oct. 12, 2023

(30) Foreign Application Priority Data

Nov. 10, 2020   (GR) .............................. 20200100676

(51) Int. Cl.
*H04W 74/0808*   (2024.01)
*H04W 92/18*   (2009.01)

(52) U.S. Cl.
CPC ........ *H04W 74/0808* (2013.01); *H04W 92/18* (2013.01)

(58) Field of Classification Search
CPC .......................... H04W 74/0808; H04W 92/18
See application file for complete search history.

(56) References Cited

U.S. PATENT DOCUMENTS

2018/0049143 A1 *   2/2018  Gupta ................... H04W 16/14

OTHER PUBLICATIONS

International Search Report and Written Opinion—PCT/US2021/057922—ISA/EPO—Feb. 28, 2022.

* cited by examiner

*Primary Examiner* — Myron Wyche
(74) *Attorney, Agent, or Firm* — Procopio, Cory, Hargreaves & Savitch LLP

(57) ABSTRACT

To facilitate efficient LBT sidelink sensing procedures, methods, apparatuses, and computer program products are provided. An example method of a sidelink wireless device includes initiating an LBT sidelink sensing procedure including initiating an LBT timer to run for at least a minimum sensing duration in a channel. The example method further includes detecting one or more signals in the channel during the LBT side link sensing procedure. The example method further includes allowing the LBT timer to continue to run.

30 Claims, 14 Drawing Sheets

LBT PROCEDURE FOR SIDELINK OPERATIONS IN UNLICENSED BANDS

CROSS REFERENCE TO RELATED APPLICATION(S)

This application is a National Stage Application filed under 35 U.S.C. § 371 of PCT International Application No. PCT/US2021/057922, entitled "LBT PROCEDURE FOR SIDELINK OPERATIONS IN UNLICENSED BANDS" and filed on Nov. 3, 2021, which claims the benefit of and priority to Greek patent application No. 20200100676, entitled "LBT PROCEDURE FOR SIDELINK OPERATIONS IN UNLICENSED BANDS," and filed on Nov. 10, 2020, which are expressly incorporated by reference herein in their entirety.

BACKGROUND

Technical Field

The present disclosure relates generally to communication systems, and more particularly, to sidelink, such as vehicle-to-everything (V2X) or other device-to-device (D2D) communications with listen before talk (LBT) sensing.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X and/or other D2D communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a wireless device are provided. The wireless device may initiate an LBT sidelink sensing procedure including initiating an LBT timer to run for at least a minimum sensing duration in a channel. The wireless device may detect one or more signals in the channel during the LBT sidelink sensing procedure. The wireless device may allow the LBT timer to continue to run, such as based at least in part on determining that the one or more signals are one or more sidelink signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
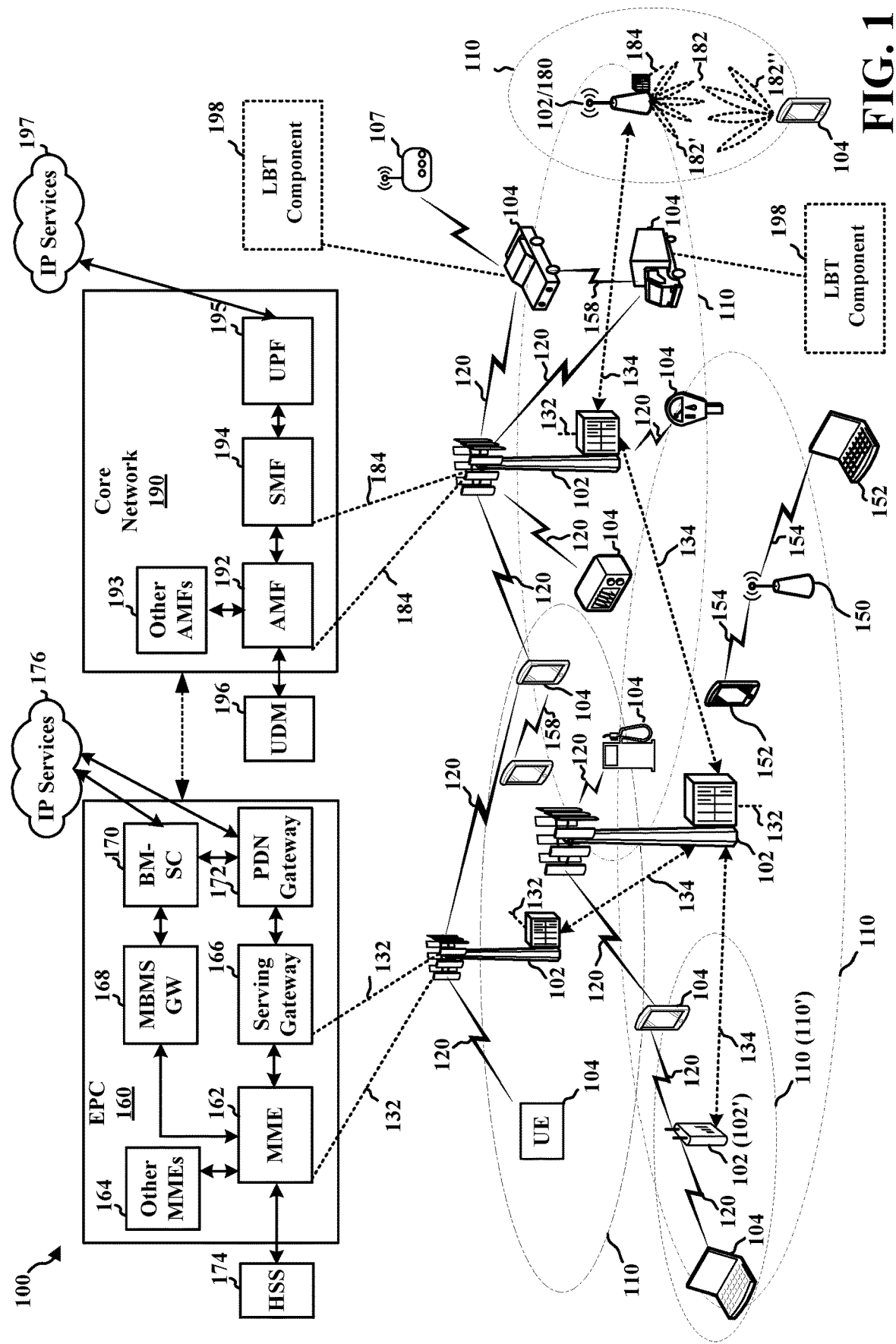
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A sidelink network, such as a V2X network, may be deployed in an unlicensed spectrum. To facilitate communications in the unlicensed spectrum, LBT sidelink sensing procedures may be applied prior to sidelink transmissions, such as V2X transmissions, in order to avoid collisions without other transmissions in the unlicensed spectrum. The term "LBT sidelink sensing procedure" may refer to a sensing procedure used for a sidelink transmission, i.e., a direct communication between two UEs. The other transmissions may be based on other radio access technologies (RAT)s. LBT sensing is based on energy detection, and the channel for which sensing is performed may be identified as busy due to other sidelink, e.g., V2X activities. However, identifying the channel as busy and canceling/delaying sidelink, e.g., V2X transmissions due to V2X activities may be inefficient because sidelink activities may be designed to avoid the collisions without relying on the LBT. For example, in a mode 2 sidelink resource allocation, or decentralized resource allocation mode, a sidelink UE may perform a sidelink sensing and reservation procedure. In order to avoid collisions with sidelink signals, the UE may apply sensing/reservation of resources based on sidelink. For example, the UE may monitor for sidelink reservations from other devices and may select transmission resources that avoid the reserved sidelink resources of the other devices. The cancellation/delay of sidelink transmissions reduced the efficiency of the sidelink network such as interrupting procedures such as resource selection/reservation and introduces latency. Aspects described herein provide a more efficient LBT sidelink sensing procedure for sidelink devices by considering whether a detected signal is a sidelink signal. For example, when performing LBT, if a UE detects an energy level that meets a threshold, the UE switches the LBT state to a frozen state, e.g., freezing an LBT timer under the LBT procedure. As presented herein, the UE may further consider the source of the detected energy, and if the energy is due to a sidelink transmission, the UE may continue to run the LBT timer instead of freezing the LBT timer. Thus, the LBT of a sidelink device may continue uninterrupted by the presence of sidelink signals.

FIG. 1 is a diagram illustrating an example of a wireless communications system and an access network 100. As illustrated in FIG. 1, the UE 104, Road Side Unit (RSU) 107, or other sidelink such as V2X device, may comprise an LBT component 198 configured to initiate an LBT sidelink sensing procedure including initiating an LBT timer to run for at least a minimum sensing duration in a channel. The LBT component 198 may be further configured to detect one or more signals in the channel during the LBT sidelink sensing procedure. The LBT component 198 may be further configured to allow the LBT timer to continue to run, such as based at least in part on determining that the one or more signals are one or more sidelink signals.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
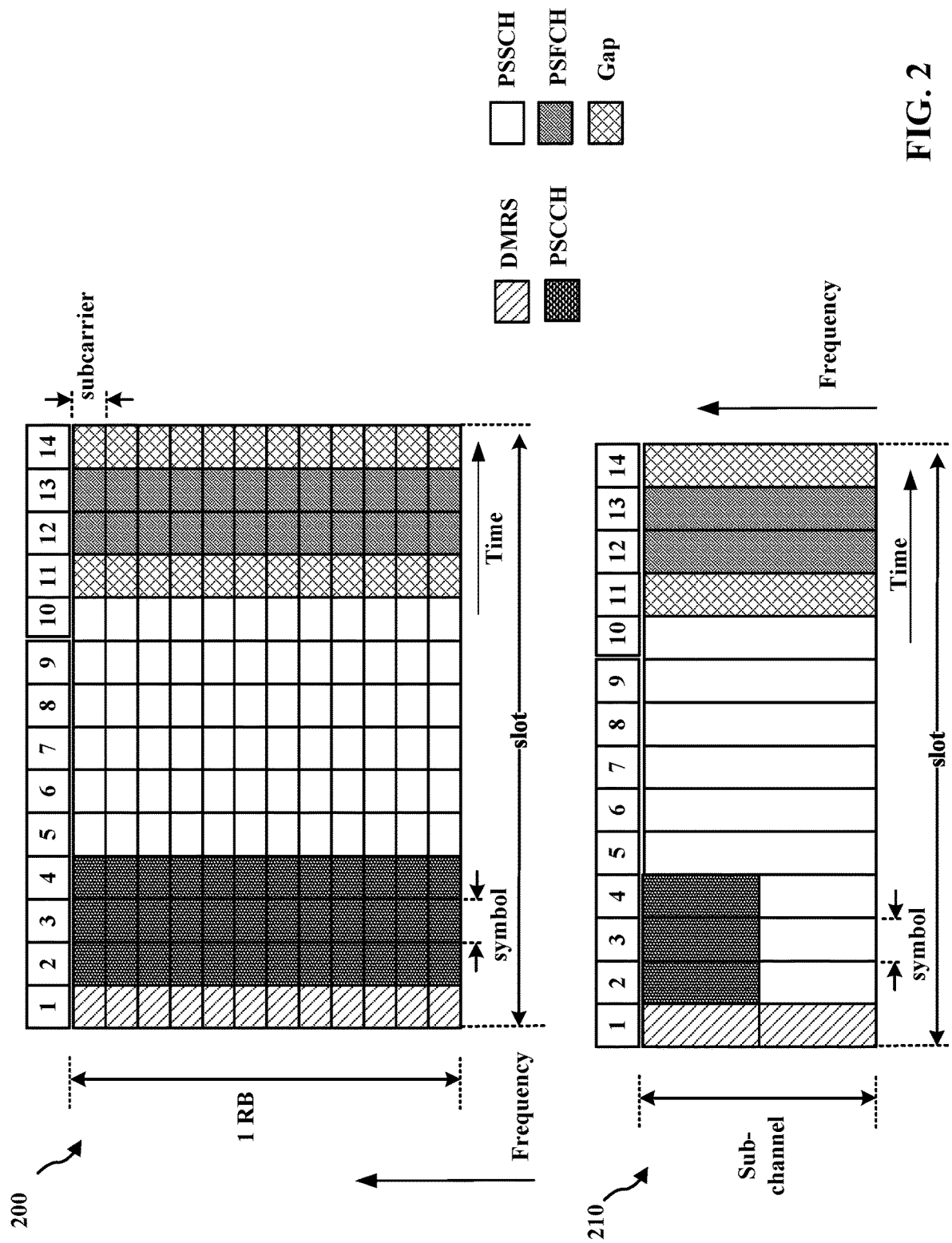
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

Figure 3:
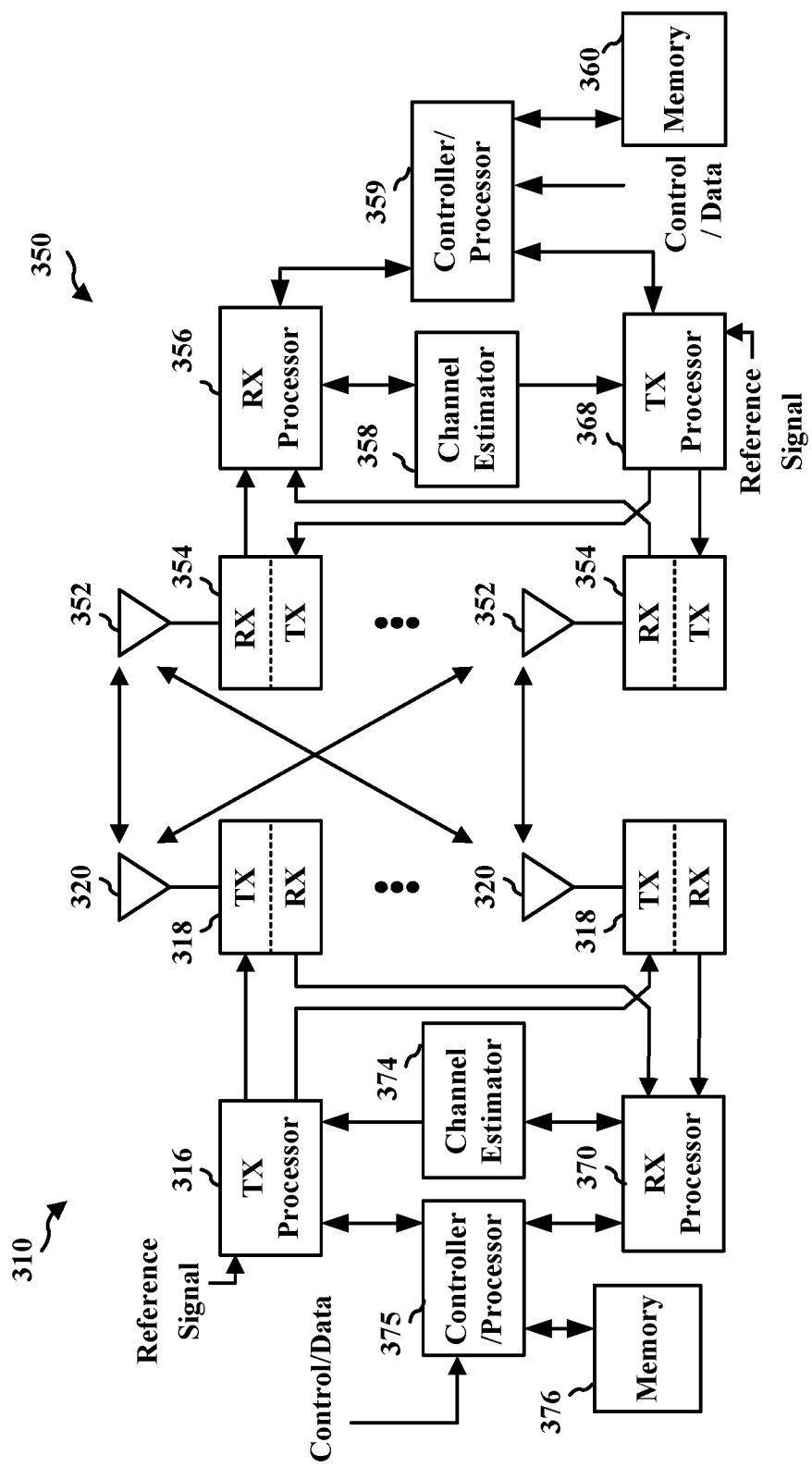
FIG. 3 is a diagram illustrating an example of a first device and a second device involved in wireless communication based, e.g., on V2X and/or other device-to-device communication.

FIG. 3 is a block diagram of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Figure 4:
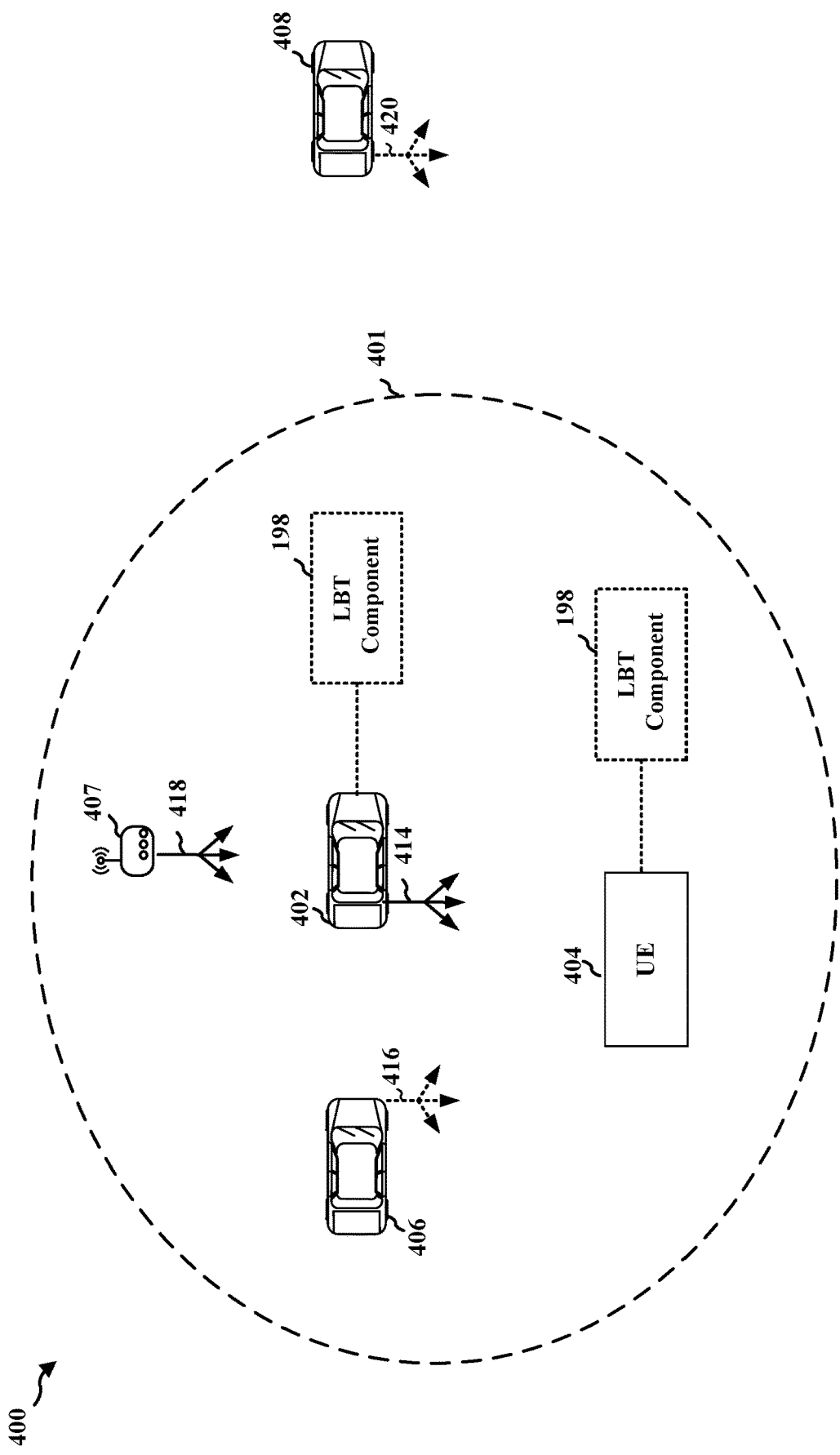
FIG. 4 illustrates an example of wireless communication between devices based on V2X or other D2D communication.

FIG. 4 illustrates an example 400 of wireless communication between devices based on V2X, D2D, or other sidelink communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel, e.g., including reservation information. The reservation information may indicate time and frequency resources that the UE 402 intends to use for a transmission. UEs that receive the control channel may use the reservation information to avoid interference by refraining from transmitting on the reserved resources. For example, the UE 402 may indicate the number of TTIs, as well as the RBs that will be occupied by the data transmission, e.g., in a control message. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication 418 to UEs 402, 404, 406, 408. One or more of the UEs 402, 404, 406, or 408 may include an LBT component 198, such as described in connection with FIG. 1.

A sidelink network, such as a CV2X network, may be deployed in an unlicensed spectrum. To facilitate communications in the unlicensed spectrum, LBT sidelink sensing procedures may be applied prior to transmissions in order to determine resources occupied by transmissions from other devices and to avoid collisions. The other transmissions may be based on different RATs. Because LBT sensing may be based on energy detection, the monitors channel being may be identified as busy due to other sidelink, such as V2X transmissions. However, identifying the channel as busy with the LBT process, and canceling/delaying sidelink transmissions based on sidelink, such as V2X activities may be inefficient because sidelink activities may be designed to avoid the collisions between sidelink communication even without the LBT sidelink sensing procedure. Thus, the LBT sidelink sensing procedure may be employed by a sidelink device in order to share the unlicensed spectrum with other RATs. Such inefficiency in delaying sidelink transmission due to the detection of sidelink signals during an LBT sidelink sensing procedure may reduce performance of the sidelink network. For example, the delay may interrupt sidelink sensing and reservation procedures.

A sidelink device may generate a new packet and may select a resource (subchannel/slot) for the sidelink transmission that may be preceded by an LBT sidelink sensing procedure. The LBT sidelink sensing procedure may be associated with an LBT timer that may be frozen during the LBT sidelink sensing procedure. The selected slot may be referred to as a target slot for the sidelink transmission. The start of the LBT sensing may be aligned such that successful termination of the LBT sidelink sensing procedure coincides with the start of the "target" slot. Therefore, the device may have an estimate of a length of the LBT (energy) sensing duration. For example, the device may consider a minimum sensing duration assuming operation in an idle channel and initiate the LBT sidelink sensing procedure accordingly. After initiating the LBT sidelink sensing procedure, the LBT timer may start to run. After the LBT timer runs for the minimum sensing duration, the LBT sidelink sensing procedure may complete and the device may transmit the packet. Because the device assumed an idle channel for initializing its LBT procedure, any detected transmission during the LBT sidelink sensing procedure may freeze the LBT timer and may render the LBT sidelink sensing procedure unable to terminate on time. Therefore, if the LBT sidelink sensing procedure is not able to finish before the target slot due to the detected transmission(s), the target slot may be abandoned (i.e., no transmission may be performed in that slot as was originally intended when the resource was selected).

Figure 5:
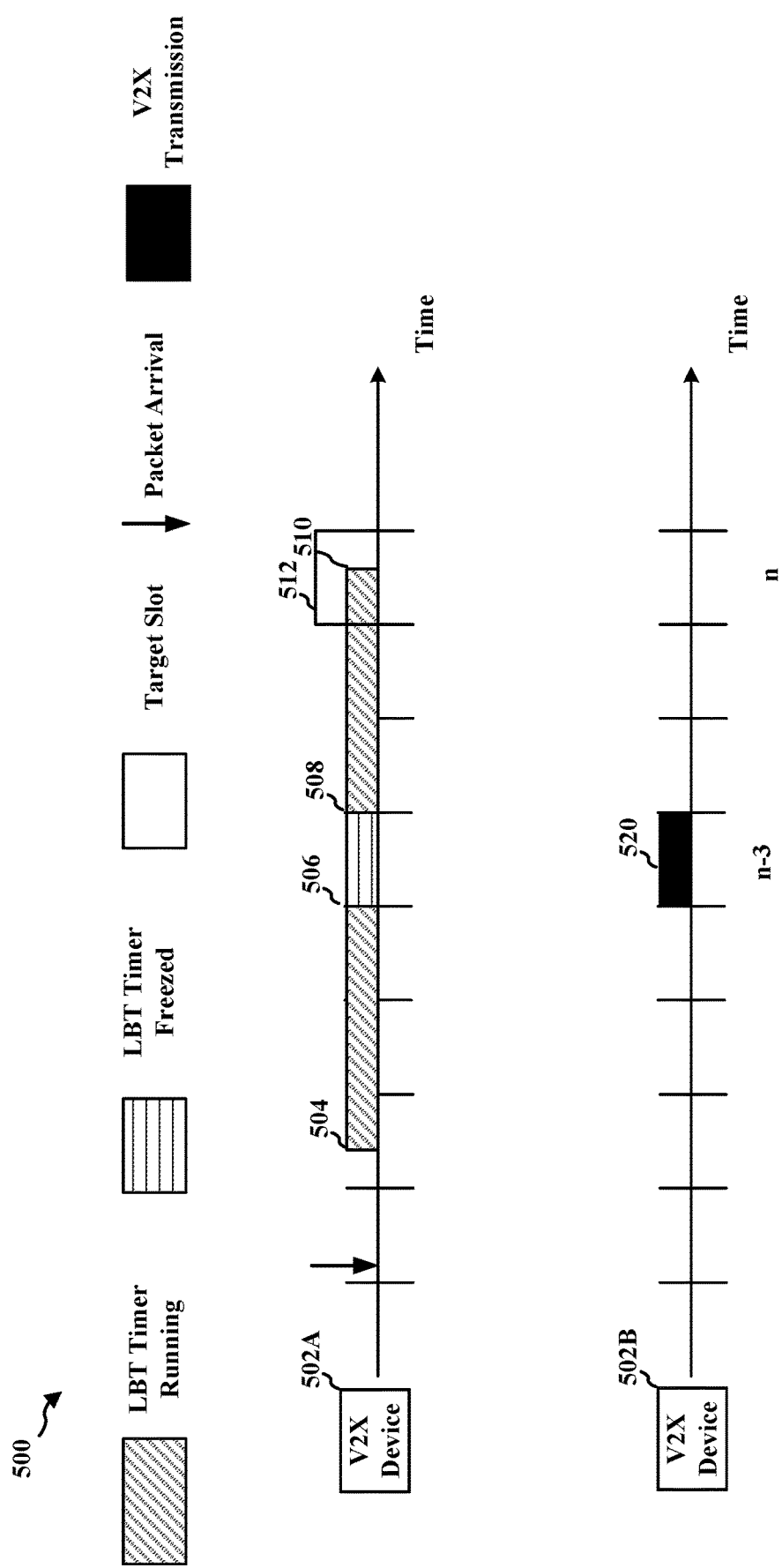
FIG. 5 illustrates an example of sidelink communication with LBT sensing.

FIG. 5 illustrates an example 500 of sidelink (V2X) device communication with LBT sensing. As illustrated in FIG. 5, in order to transmit a packet, a V2X device 502A may initiate LBT sensing at 504 after the packet arrives. The V2X device may initiate the LBT sensing such that without interference the LBT sensing period may terminate at the start of the target slot 512 (slot n), enabling the transmission of the packet. A second V2X device 502B may transmit a communication 520, or signal, at slot n−3. An energy associated with the communication 520 may be detected by the V2X device 502A and a timer of the LBT sidelink sensing procedure may temporarily "freeze" (i.e., cease/pause due to a communication) at 506 and resume at 508, rendering the V2X device 502A unable to complete the LBT sidelink sensing procedure before the target slot 512. Instead, the LBT sidelink sensing procedure may end at 510, i.e., after the start of the target slot 512, and the target slot 512 may not be used for the packet transmission.

Figure 6:
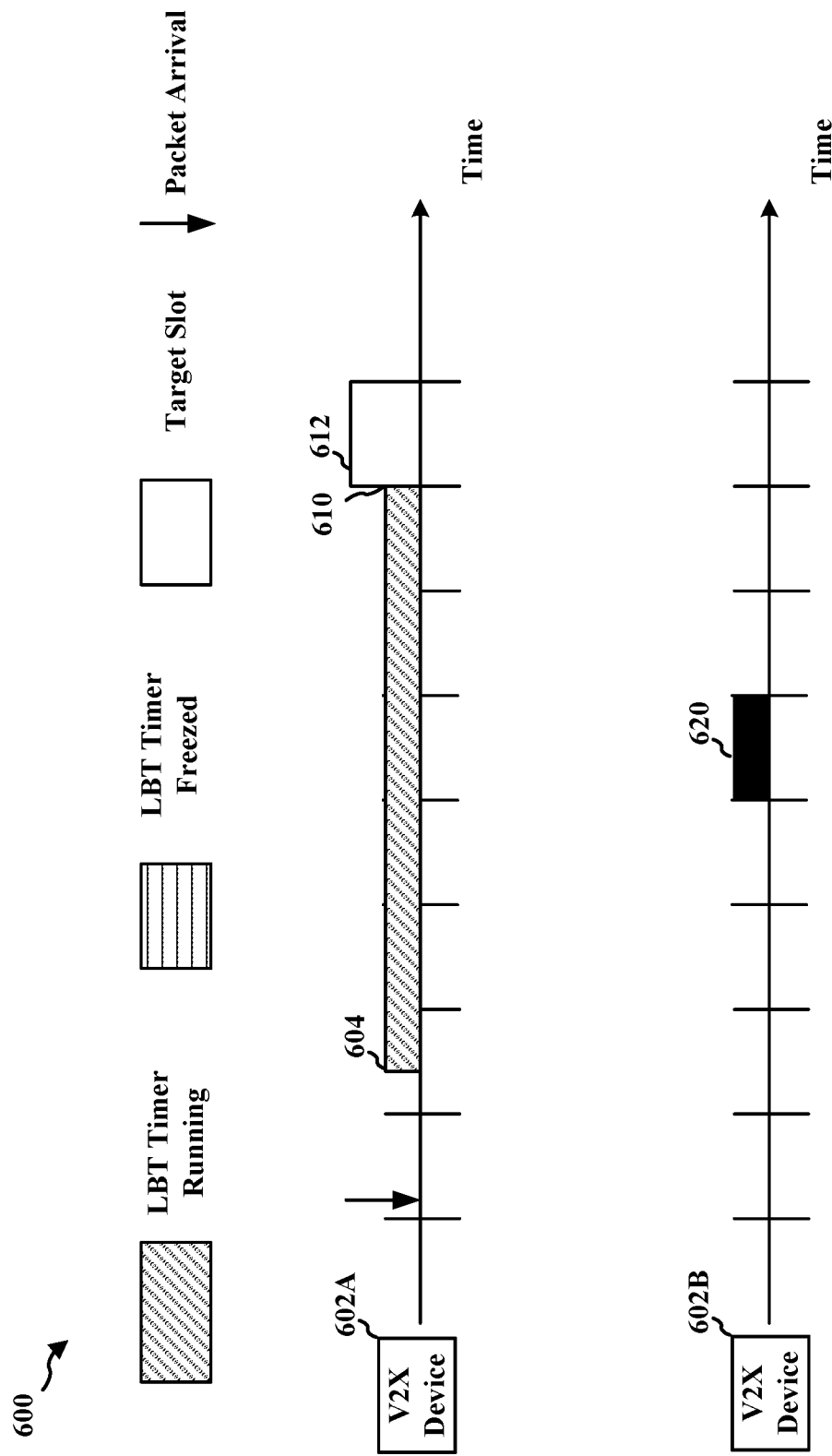
FIG. 6 illustrates an example of sidelink communication with LBT sensing.

To facilitate more efficient LBT sidelink sensing procedures, as illustrated in example 600 in FIG. 6, a V2X device 602A may determine an energy level for received communication/signals and identify the origin of the communication/signals that are detected during an LBT sensing period. As illustrated in FIG. 6, the V2X device 602A may initiate the LBT sensing period at 604. The V2X device 602A may detect a communication 620 from a V2X device 602B. The 602A may detect communication 620 by sensing the energy and then determine that the communication 620 is a V2X communication after successfully decoding sidelink control information (SCI) in the communication 620. Because the V2X device 602A successfully decoded SCI in the communication 620, the V2X device 602A may continue the LBT timer. The LBT sidelink sensing procedure may end at 610, i.e., prior to the start of the target slot 612, and the V2X device 602A may successfully transmit the packet at target slot 612. In some examples, the V2X device 602A may be a CV2X device, and may continue the LBT timer if the energy is due to a CV2X transmission.

Figure 7:
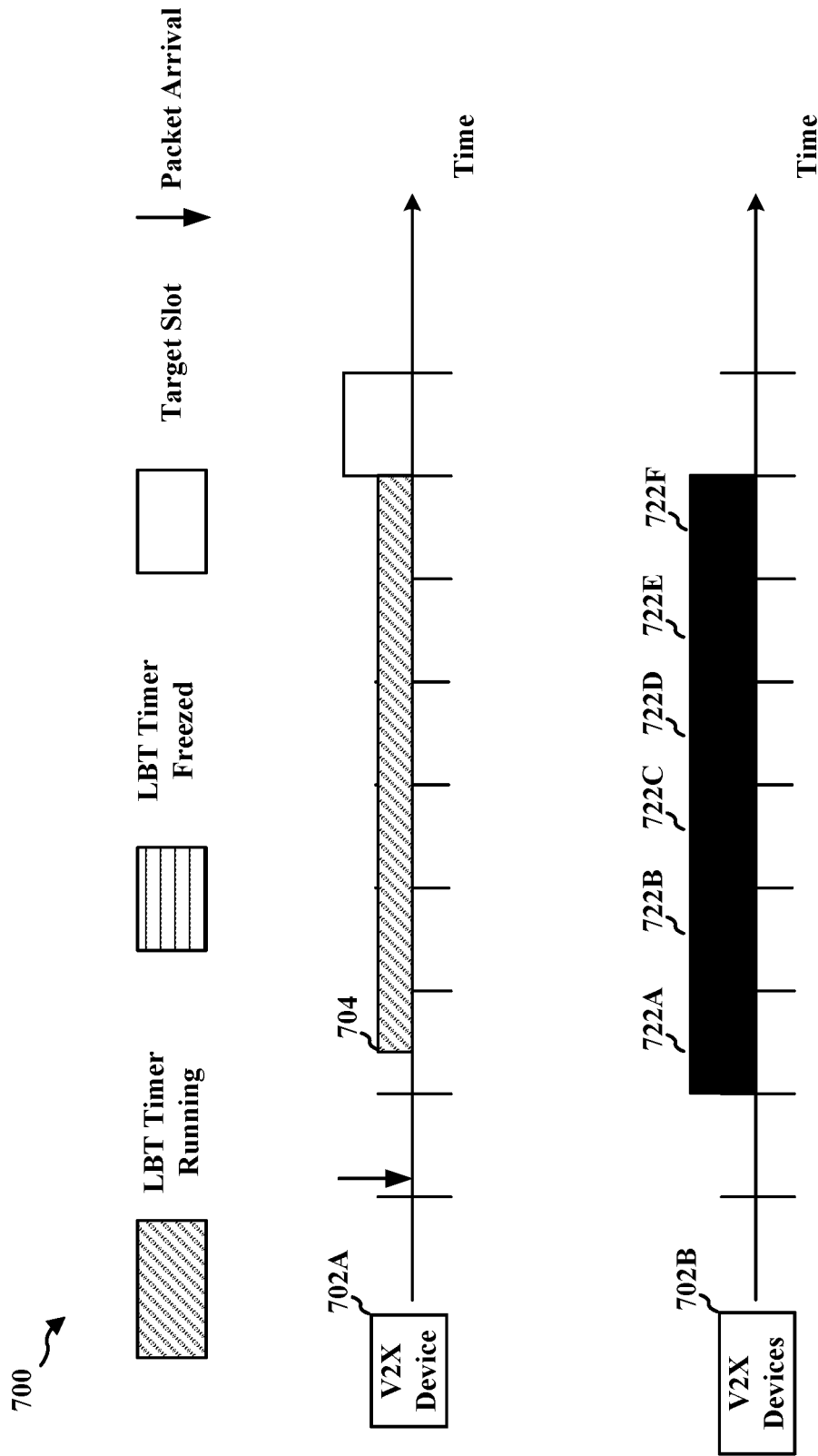
FIG. 7 illustrates an example of sidelink communication with LBT sensing.

Operations illustrated in the example 600 may lead to aggressive channel utilisation by V2X devices. As illustrated in example 700 of FIG. 7, because the V2X device 702A will continue the LBT timer starting at 704 after detecting communications 722A, 722B, 722C, 722D, 722E, and 722F from other V2X devices 702B, the V2X devices may use the channel continuously. Such continuous usage may affect other V2X devices and non-V2X devices because the channel may be continuously occupied by V2X devices.

Figure 8:
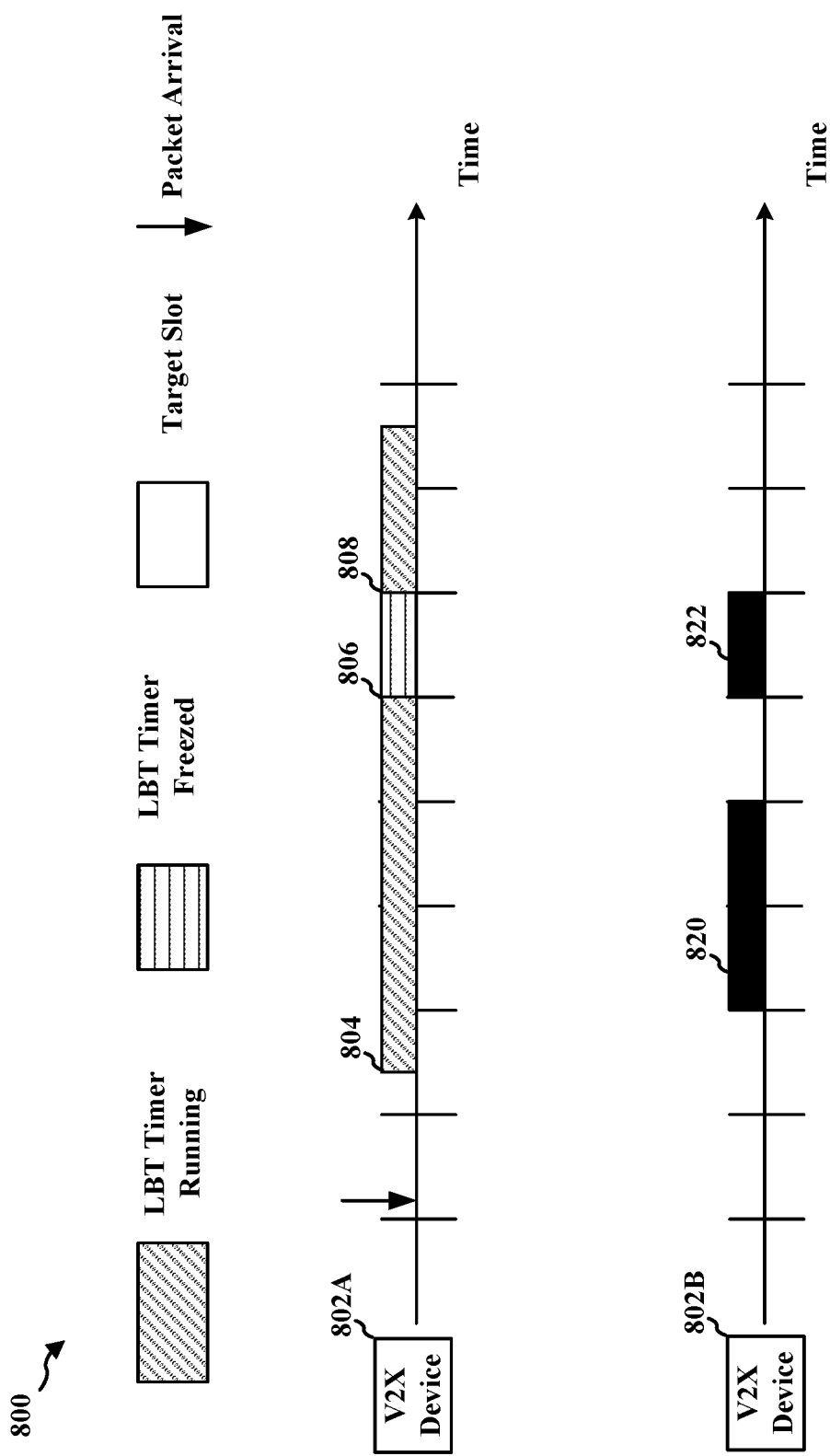
FIG. 8 illustrates an example of sidelink communication with LBT sensing.

To reduce such aggressive channel utilisation by V2X devices, as illustrated in example 800 in FIG. 8, a V2X device 802A may be configured to count the number of slots where SCI is decoded while continuing the LBT timer starting at 804. For example, based on the communication 820 from a V2X device 802B, the V2X device 802A may count two slots where the SCI is decoded. After the number of slots where SCI is decoded reaches a threshold of two, the V2X device 802A may decode another SCI in communication 822 and may freeze the LBT timer at 806 and resume the LBT timer at 808 accordingly.

Figure 9:
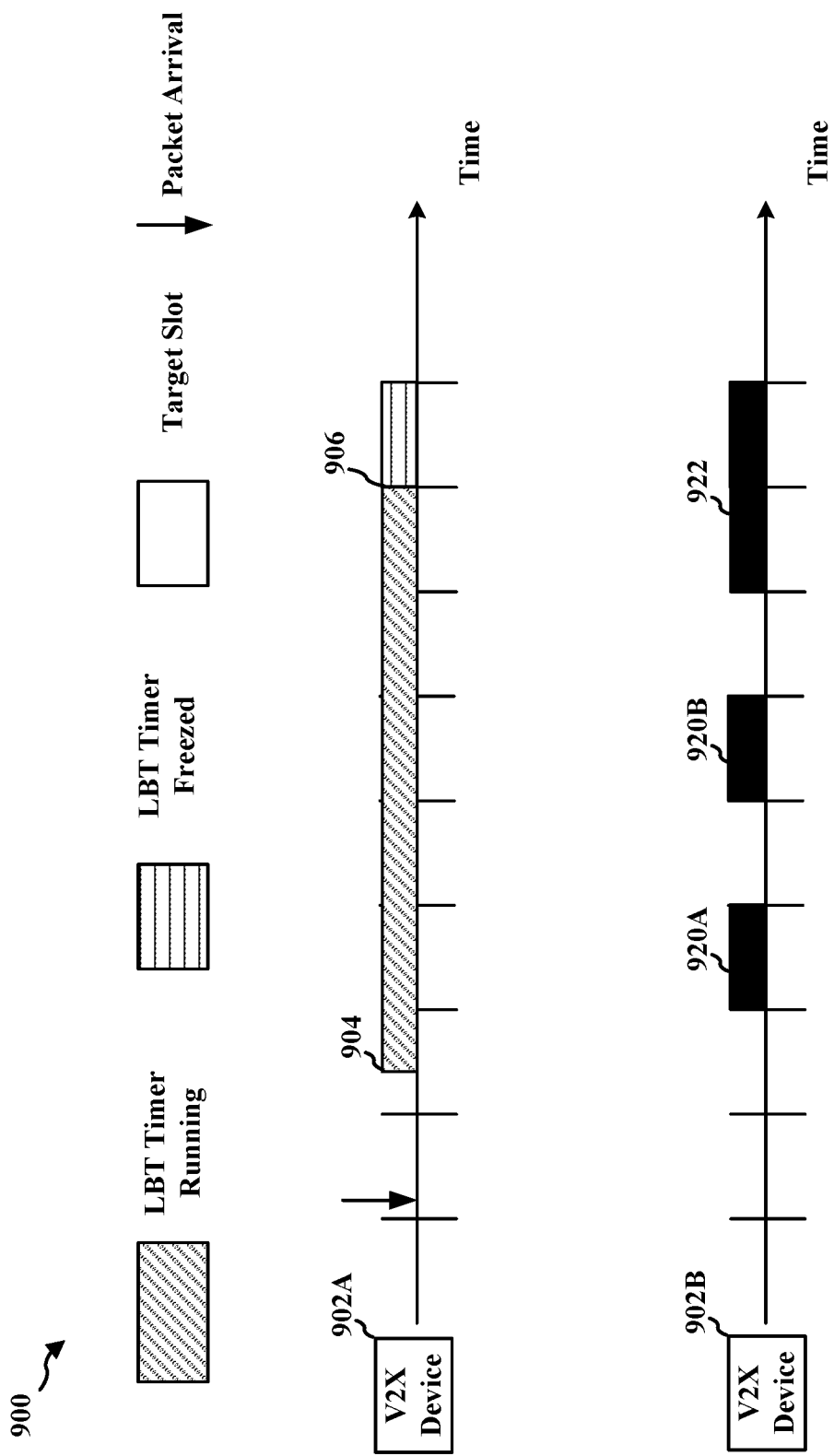
FIG. 9 illustrates an example of sidelink communication with LBT sensing.

In some aspects, as illustrated in example 900 in FIG. 9, a V2X device 902A may be configured to continue the LBT timer starting at 904 if isolated slots (i.e., slots that are not immediately preceded or followed by an active V2X slot) with SCI are detected. For example, the V2X device 902A may decode SCI in communication 920A and communication 920B from V2X device 902B and continue the LBT timer because the communication 920A and the communication 920B are associated with isolated slots. After the V2X device 902A decodes SCI in communication 922 and detects an immediately following slot with SCI in the communication 922, the V2X device 902A may freeze the LBT timer at 906. In some aspects, instead of determining isolated slots, the V2X device may determine the number of consecutive slots with SCI and freeze the timer after a threshold is reached (threshold=1 for isolated slot aspect).

Figure 10:
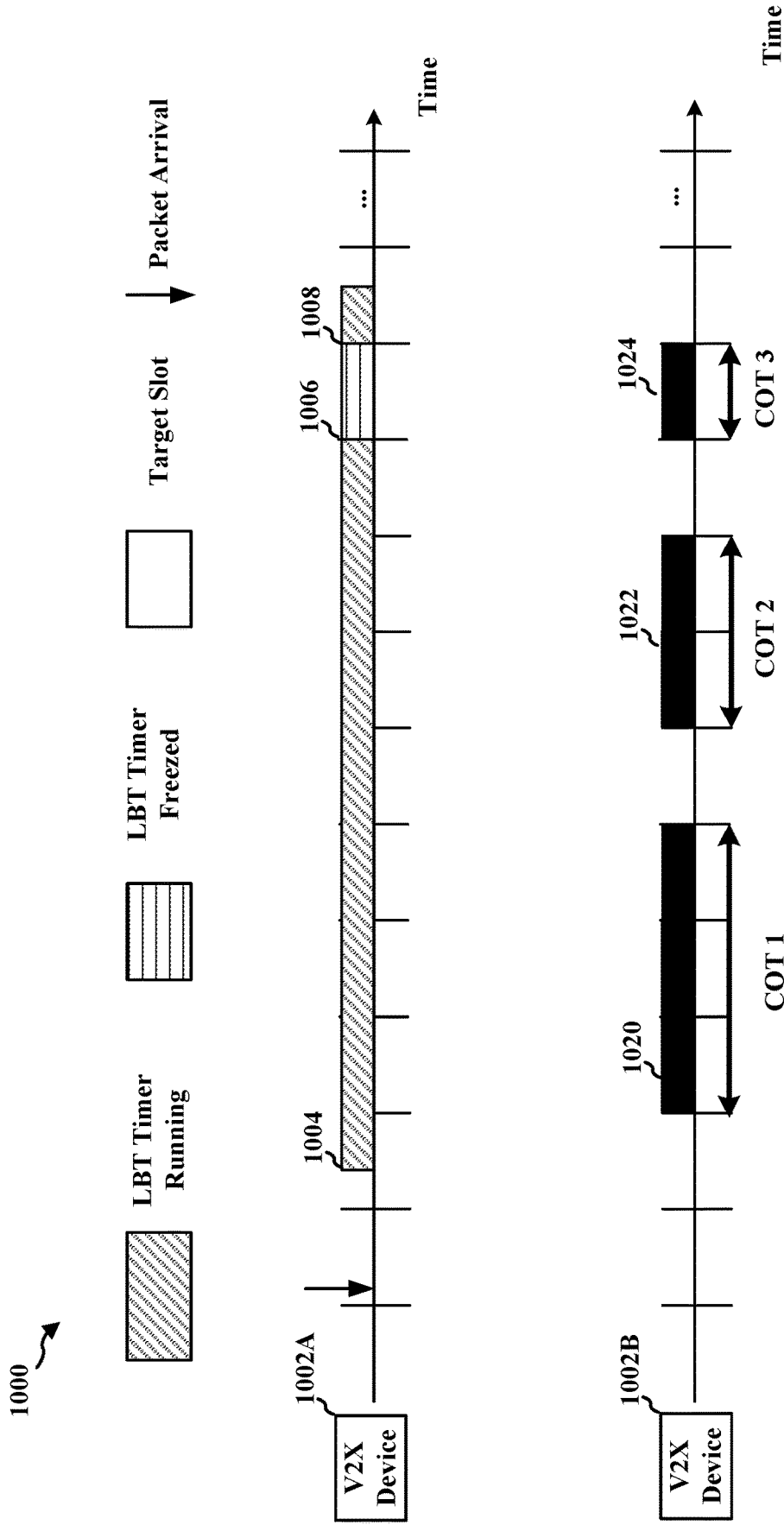
FIG. 10 illustrates an example of sidelink communication with LBT sensing.

In some aspects, as illustrated in example 1000 in FIG. 10, a V2X device 1002A may be configured to continue the LBT timer starting at 1004 after detecting V2X communication as part of channel occupancy time (COTs) and if a number of COTs has not reached a threshold. A V2X device 1002B that identified the channel as idle (after performing LBT) and begins transmission may initiate a "channel occupancy" with duration COT that may span multiple V2X slots. The COT duration may be indicated in SCI and the SCI may indicate that one or more slots that are associated with the same COT. If another V2X device detects the COT, e.g., by decoding the SCI, and determines that the COT is not fully utilized, the V2X device may transmit within the COT without LBT and indicate the remaining COT duration in SCI. In some aspects, the V2X device 1002A may be configured to ignore (i.e., continuing without freezing the LBT timer) a configured number of V2X initiated COTs. For example, if the V2X device 1002A is configured to ignore 2 COTs, the V2X device 1002A may ignore COT 1 at communication 1020 and COT 2 at communication 1022 and freeze the LBT timer at 1006 after detecting a third COT at 1024. The V2X device 1002A may continue the LBT timer at 1008.

Figure 11:
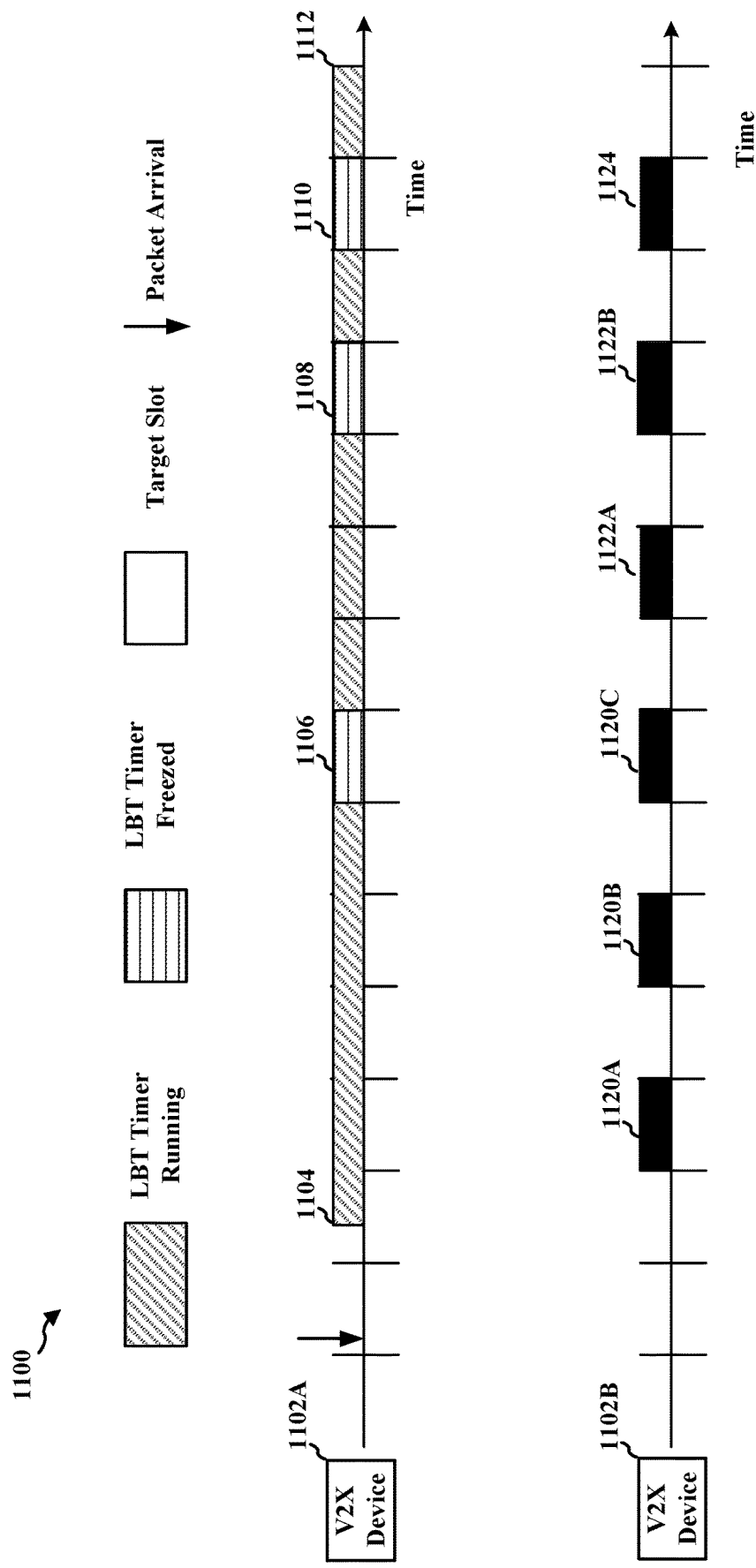
FIG. 11 illustrates an example of sidelink communication with LBT sensing.

In some aspects, as illustrated in example 1100 in FIG. 11, a V2X device 1102A may be configured to continue the LBT timer starting at 1104 after detecting two isolated active V2X slots 1120A and 1120B that is used by a V2X device 1102B. After detecting a third active V2X isolated slot 1120C, the V2X device 1102A may determine to stop the LBT timer at 1106. The term "LBT sensing cycle" may be used to refer to a continuous cycle where the LBT timer is running, e.g., between 1104 and 1106. For each LBT cycle, the V2X device 1102A may freeze the LBT timer based on a different set of rules. For example, for the cycle between 1104 and 1106, the V2X device 1102A may stop the LBT timer based on a threshold of three isolated active V2X slots. After resuming the LBT timer, the V2X device 1102A may adjust the rules for freezing the LBT timer. In some aspects, the adjustments may be based on the type of activity (e.g., whether it was a V2X signal or a non-CV2X signal) that caused the LBT timer to freeze. In some aspects, the adjustments may be based on the number of times where the LBT timer has stopped during the current LBT sidelink sensing procedure. For example, at a second LBT sensing cycle starting after 1106, the V2X device 1102A may be configured to freeze the LBT timer at 1108 after detecting two isolated active V2X slots at 1122A and 1122B. At a third LBT sensing cycle starting after 1108, the V2X device 1102A may be configured to freeze the LBT timer at 1110 after detecting one isolated active V2X slot at 1124. At 1112, the LBT timer may expire and the V2X device 1102A may transmit the packet.

Because the V2X SCI may be distributed over the first OFDM symbols of the slot, a V2X receiver may wait for some time after a V2X transmission has started in order to be able to decode the SCI. Therefore, when energy is detected at the very start of a slot, the LBT of a V2X device may first assume that the energy is V2X-originated and continue as if no signal is present. If an SCI is decoded later in the slot, the LBT may continue. If the SCI is not decoded by the expected time, the LBT timer may freeze as the V2X device may treat the signal as a non-V2X signal. When the LBT sidelink sensing procedure is resumed, it may be continued from the state at the slot start of the detected non-V2X signal. Similarly, if the V2X device determines to freeze the LBT timer because of a COT, the LBT timer may be continued from the state at the beginning of the COT.

V2X wireless devices may initiate a new LBT sidelink sensing procedure with a set of rules for the LBT timer being the same as or different from the previous LBT sidelink sensing procedure. For example, for a LBT first initiates it may be set to ignore (i.e., continuing without freezing LBT timer after detecting) up to two V2X slots, for the next sensing procedure it may ignore one V2X slot, and for the following procedures, it may not ignore V2X slots. The new set of rules may depend on the type of activity that interrupted the previous procedure (i.e., whether it was a V2X signal or a non-V2X signal that interrupted the LBT). Although FIGS. 5-11 are described in connection with V2X communication, the aspects may be applied to other types of sidelink communication in the unlicensed spectrum or to other types of communication in the unlicensed spectrum that includes a separate mechanism than LBT for avoiding collisions.

Figure 12:
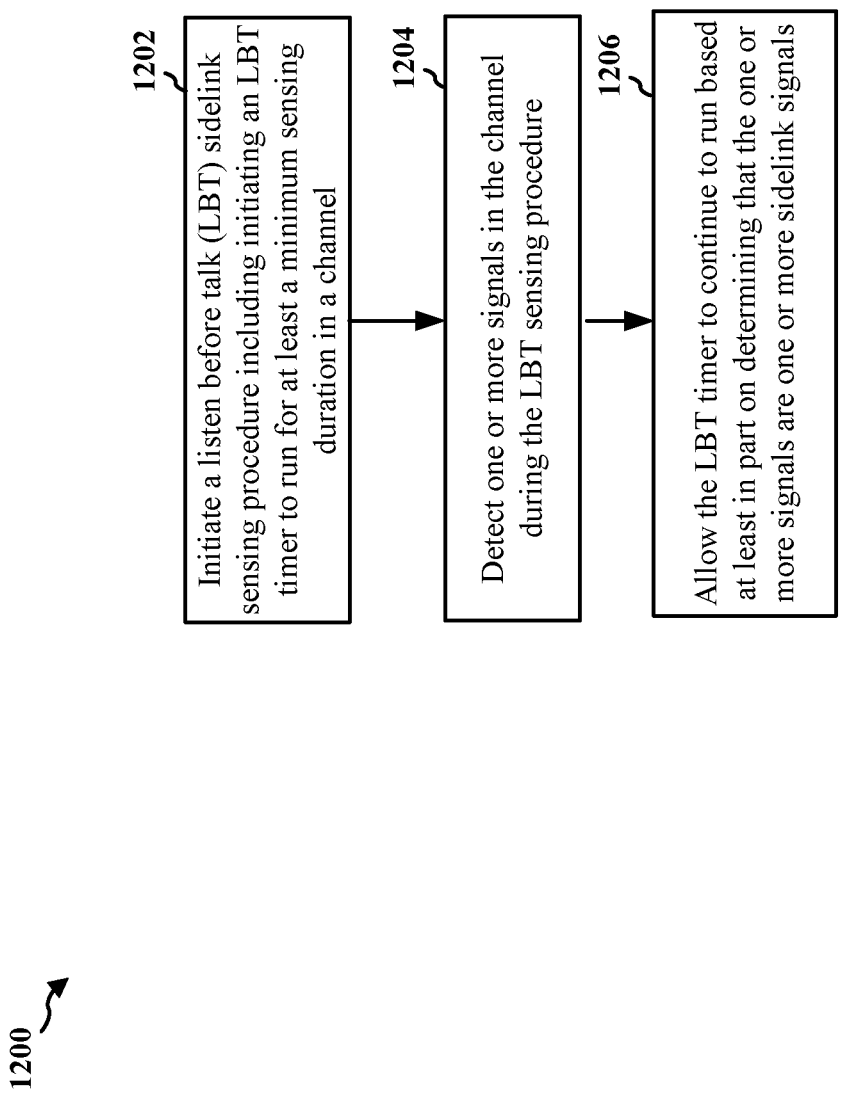
FIG. 12 is a flowchart of a method of wireless communication including LBT sensing.

FIG. 12 is a flowchart 1200 of a method of wireless communication. The method may be performed by a sidelink, such as a V2X wireless device (e.g., the UE 104, the wireless device 502A, the wireless device 602A, the wireless device 702A, the wireless device 802A, the wireless device 902A, the wireless device 1002A, the apparatus 1402). The method may enable the wireless device to ignore one or more V2X signals during LBT to facilitate more efficient LBT sidelink sensing procedures.

At 1202, the wireless device initiates an LBT sidelink sensing procedure including initiating an LBT timer to run for at least a minimum sensing duration in a channel. For example, the initiation 1202 may be performed by an LBT initiation component 1442 of FIG. 14. The initiation 1202 may correspond to the LBT initiation 604, the LBT initiation 704, the LBT initiation 804, the LBT initiation 904, the LBT initiation 1004, or the like in FIGS. 6-11.

At 1204, the wireless device detects one or more signals in the channel during the LBT sidelink sensing procedure. For example, the detection 1204 may be performed by a signal detection component 1444 of FIG. 14. The detection 1204 may correspond to the detections of the communication 620, the communications 722A-F, the communication 820, the communication 920A/B, the communication 1020, or the communication 1022 in FIGS. 6-11. In some aspects, detecting the one or more signals in the channel during the LBT sidelink sensing procedure includes detecting energy.

At 1206, the wireless device allows the LBT timer to continue to run, e.g., based at least in part on determining that the one or more signals are one or more sidelink signals. For example, the determination 1206 may be performed by a continuation determination component 1446 of FIG. 14. In some aspects, the wireless device determines that the one or more signals are one or more sidelink signals based on successfully decoding sidelink control information (SCI) associated with the one or more signals. The device may determine to continue the LBT timer based on determining that the one or more signals are the one or more sidelink signals. The wireless device may determine that the one or more signals are one or more sidelink signals after decoding an SCI for each slot associated with each signal. In some aspects, determining to continue the LBT timer may be based on if the one or more signals are sidelink signals, e.g., as described in connection with FIGS. 6 and 7. In some aspects, determining to continue the LBT timer may further include determining that the one or more signals are one or more sidelink signals that satisfy a set of sidelink metrics (e.g., rules for freezing the LBT timer as described in connection with FIGS. 8-11) In some aspects, determining to continue the LBT timer after determining that the one or more signals are the one or more sidelink signals that satisfy a set of sidelink metrics further includes counting a number of slots where the SCI is decoded and determining that the one or more signals satisfy the set of sidelink metrics until a slot number threshold is reached, e.g., as described in connection with FIG. 8. In some aspects, determining to continue the LBT timer after determining that the one or more signals are the one or more sidelink signals that satisfy a set of sidelink metrics further includes determining that the one or more signals are associated with one or more isolated sidelink slots that are not immediately preceded or followed by an active sidelink slot (i.e., a V2X slot over which a V2X transmission is detected, e.g., as described in connection with FIG. 9). In some aspects, allowing the LBT timer to continue to run further includes determining that one or more consecutive slots associated with the one or more signals last shorter than a duration. In some aspects, determining that the one or more consecutive slots associated with the one or more signals last shorter than the duration is based on SCI associated with the one or more signals. In some aspects, the one or more signals are associated with a number of channel occupancy times, each channel occupancy time comprising one or more consecutive slots, and wherein allowing the LBT timer to continue to run further includes determining the number of channel occupancy times is less than a threshold, e.g., as described in connection with FIG. 10. In some aspects, determining that the number of channel occupancy times is less than the threshold is based on SCI associated with the one or more signals.

Figure 13:
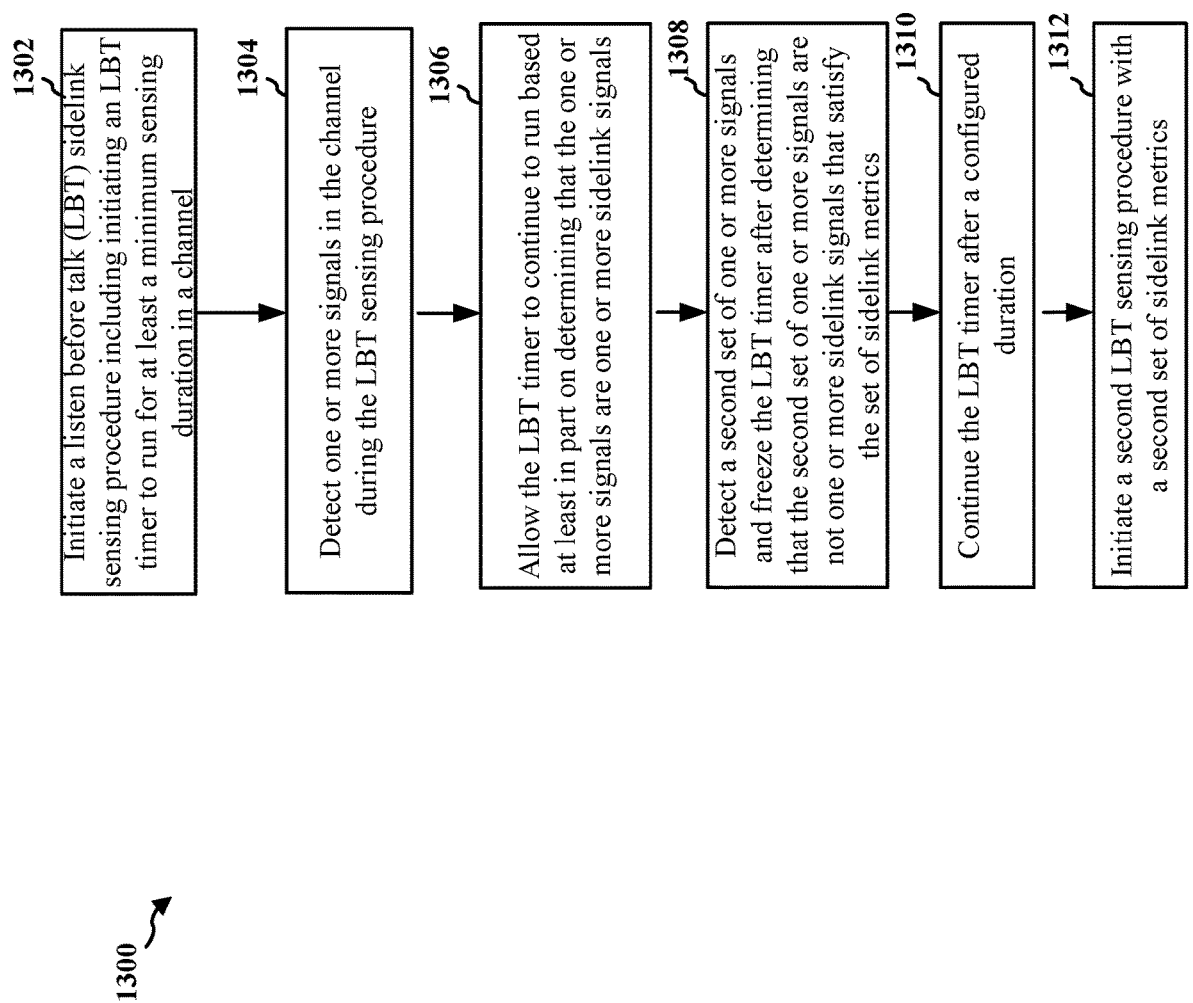
FIG. 13 is a flowchart of a method of wireless communication including LBT sensing.

FIG. 13 is a flowchart 1300 of a method of wireless communication. The method may be performed by a sidelink, such as a V2X wireless device (e.g., the UE 104, the wireless device 502A, the wireless device 602A, the wireless device 702A, the wireless device 802A, the wireless device 902A, the wireless device 1002A, the apparatus 1402). The method may enable the wireless device to ignore one or more V2X signals during LBT to facilitate more efficient LBT sidelink sensing procedures.

At 1302, the wireless device initiates an LBT sidelink sensing procedure including initiating an LBT timer to run for at least a minimum sensing duration in a channel. For example, the initiation 1302 may be performed by an LBT initiation component 1442 of FIG. 14. The initiation 1302 may correspond to the LBT initiation 604, the LBT initiation 704, the LBT initiation 804, the LBT initiation 904, the LBT initiation 1004, or the like in FIGS. 6-11.

At 1304, the wireless device detects one or more signals in the channel during the LBT sidelink sensing procedure. For example, the detection 1304 may be performed by a signal detection component 1444 of FIG. 14. The detection 1304 may correspond to the detections of the communication 620, the communications 722A-F, the communication 820, the communication 920A/B, the communication 1020, or the communication 1022 in FIGS. 6-11. In some aspects, detecting the one or more signals in the channel during the LBT sidelink sensing procedure includes detecting energy.

At 1306, the wireless device allows the LBT timer to continue to run, e.g., based at least in part on determining that the one or more signals are one or more sidelink signals. For example, the determination 1306 may be performed by a continuation determination component 1446 of FIG. 14. In some aspects, the wireless device determines that the one or more signals are one or more sidelink signals based on successfully decoding sidelink control information (SCI) associated with the one or more signals. The device may determine to continue the LBT timer based on determining that the one or more signals are the one or more sidelink signals. The wireless device may determine that the one or more signals are one or more sidelink signals after decoding an SCI for each slot associated with each signal. In some aspects, determining to continue the LBT timer may be based on if the one or more signals are sidelink signals, e.g., as described in connection with FIGS. 6 and 7. In some aspects, determining to continue the LBT timer may further include determining that the one or more signals are one or more sidelink signals that satisfy a set of sidelink metrics (e.g., rules for freezing the LBT timer as described in connection with FIGS. 8-11) In some aspects, determining to continue the LBT timer after determining that the one or more signals are the one or more sidelink signals that satisfy a set of sidelink metrics further includes counting a number of slots where the SCI is decoded and determining that the one or more signals satisfy the set of sidelink metrics until a slot number threshold is reached, e.g., as described in connection with FIG. 8. In some aspects, determining to continue the LBT timer after determining that the one or more signals are the one or more sidelink signals that satisfy a set of sidelink metrics further includes determining that the one or more signals are associated with one or more isolated sidelink slots that are not immediately preceded or followed by an active sidelink slot (i.e., a V2X slot over which a V2X transmission is detected, e.g., as described in connection with FIG. 9). In some aspects, allowing the LBT timer to continue to run further includes determining that one or more consecutive slots associated with the one or more signals last shorter than a duration. In some aspects, determining that the one or more consecutive slots associated with the one or more signals last shorter than the duration is based on SCI associated with the one or more signals. In some aspects, the one or more signals are associated with a number of channel occupancy times, each channel occupancy time comprising one or more consecutive slots, and wherein allowing the LBT timer to continue to run further includes determining the number of channel occupancy times is less than a threshold, e.g., as described in connection with FIG. 10. In some aspects, determining that the number of channel occupancy times is less than the threshold is based on SCI associated with the one or more signals.

At 1308, the wireless device detects a second set of one or more signals and freezes the LBT timer after determining that the second set of one or more signals are not the one or more sidelink signals that satisfy a first set of sidelink metrics. For example, the determination 1108 may be performed by a freezing determination component 1448 of FIG. 14. The second set of one or more signals may correspond to the communication 822 in FIG. 8, the communication 922 in FIG. 9, the communication 1024 in FIG. 10, or the like.

At 1310, the wireless device continues the LBT timer after a configured duration. For example, continuation 1310 may be performed by the LBT initiation component 1442. The continuation 1310 may correspond to the continuation 808, the continuation 1008, or the like in FIGS. 6-11. The configured duration may be referred as a "freeze duration". In some aspects, the LBT timer may be continued with a second set of sidelink metrics. The second set of sidelink metrics is based on the one or more signals that are not the one or more sidelink signals that satisfy the first set of sidelink metrics, e.g., as described in connection with FIG. 11.

At 1312, the wireless device initiates a second LBT sidelink sensing procedure with a second set of sidelink metrics. For example, initiation 1312 may be performed by the LBT initiation component 1442 of FIG. 14. The second set of sidelink metrics may be the same as or different from the set of sidelink metrics in initiation 1302. In some aspects, the second set of sidelink metrics is based on the LBT sidelink sensing procedure (e.g., whether a timer associated with the LBT sidelink sensing procedure was frozen for sidelink or non sidelink signals, the signals that cause the timer to freeze, or the like).

Figure 14:
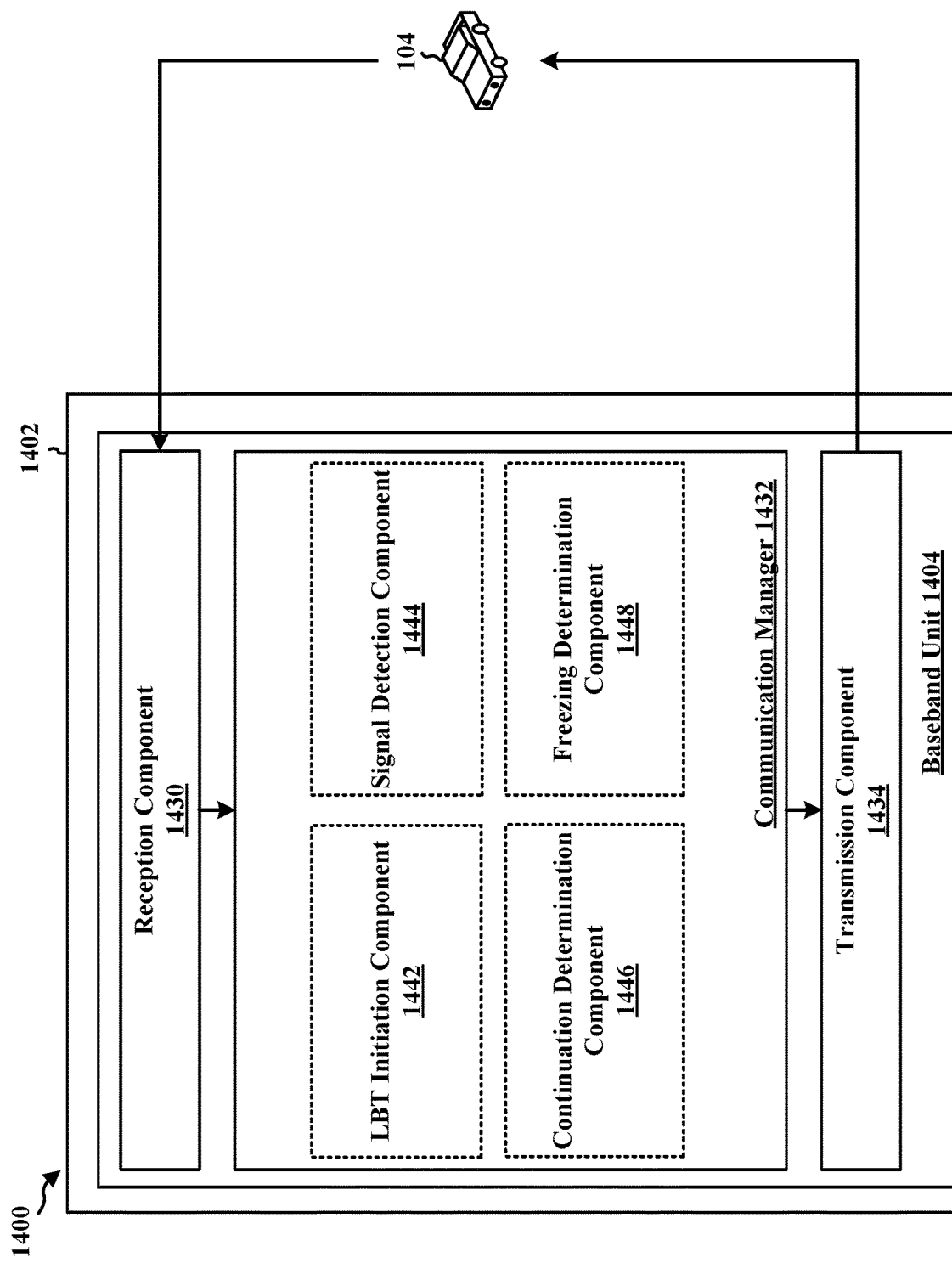
FIG. 14 is a diagram illustrating an example of a hardware implementation for an apparatus employing a processing system.

FIG. 14 is a diagram 1400 illustrating an example of a hardware implementation for an apparatus 1402. The apparatus 1402 is a wireless device and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the device 310/450 and may include the memory 360/376 and/or at least one of the TX processor 316/368, the RX processor 356/370, and the controller/processor 359/375.

The communication manager 1432 includes an LBT initiation component 1442 that initiates an LBT sidelink sensing procedure including initiating an LBT timer to run for at least a minimum sensing duration in a channel, e.g., as described in connection with initiation 1302 and 1312 of FIG. 13, and 1202 of FIG. 12. The communication manager 1432 may further include a signal detection component 1444 that detects one or more signals in the channel during the LBT sidelink sensing procedure, e.g., as described in connection with detection 1304 and detection 1308 of FIG. 13, and 1204 of FIG. 12. The communication manager 1432 may further include a continuation determination component 1446 that determines to allow the LBT timer to continue to run, e.g., based at least in part on determining that the one or more signals are one or more sidelink signals, e.g., as described in connection with determination 1306 of FIG. 13, and 1206 of FIG. 12. The communication manager 1432 may further include a freezing determination component 1448 that freezes the LBT sidelink sensing procedure after determining that the second set of one or more signals are not the one or more sidelink signals that satisfy a first set of sidelink metrics and continuing the LBT timer after a duration with a second set of sidelink metrics, e.g., as described in connection with determination 1308 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for initiating an LBT sidelink sensing procedure including initiating an LBT timer to run for at least a minimum sensing duration in a channel. In some aspects, the apparatus 1402, and in particular the baseband unit 1404, further includes means for detecting one or more signals in the channel during the LBT sidelink sensing procedure. In some aspects, the apparatus 1402, and in particular the baseband unit 1404, further includes means for allowing the LBT timer to continue to run. In some aspects, the apparatus 1402, and in particular the baseband unit 1404, further includes means for detecting a second set of one or more signals and freezing the LBT timer after determining that the second set of one or more signals are not the one or more sidelink signals that satisfy the set of sidelink metrics. In some aspects, the apparatus 1402, and in particular the baseband unit 1404, further includes means for continuing the LBT timer after a configured duration. In some aspects, the apparatus 1402, and in particular the baseband unit 1404, further includes means for initiating a second LBT sidelink sensing procedure with a second set of sidelink metrics.

The aforementioned means may be one or more of the aforementioned components of the apparatus 1402 configured to perform the functions recited by the aforementioned means. As described supra, the apparatus 1402 may include the TX processor 316/368, the RX processor 356/370, and the controller/processor 359/375. As such, in one configuration, the aforementioned means may be the TX processor 316/368, the RX processor 356/370, and the controller/processor 359/375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

The following aspects are illustrative only and may be combined with other aspects or teachings described herein, without limitation.

Aspect 1 is a method of wireless communication at a sidelink wireless device, comprising: initiating a LBT sensing procedure including initiating an LBT timer to run for at least a minimum sensing duration in a channel; detecting one or more signals in the channel during the LBT sensing procedure; and determining to allow the LBT timer to continue to run.

Aspect 2 is the method of aspect 1, wherein the device determines to freeze the LBT timer if the one or more signals are not sidelink signals.

Aspect 3 is the method of any of aspects 1 or 2, further comprising continuing the LBT timer after a configured duration.

Aspect 4 is the method of any of aspects 1-3, further comprising: determining that the one or more signals are one or more sidelink signals based on successfully decoding SCI associated with the one or more signals, wherein the device determines to continue the LBT timer based on determining that the one or more signals are the one or more sidelink signals.

Aspect 5 is the method of any of aspects 1-4, wherein determining to allow the LBT timer to continue to run is further based on determining that the one or more signals are one or more sidelink signals that satisfy a set of sidelink metrics.

Aspect 6 is the method of any of aspects 1-5, wherein determining to continue the LBT timer further comprises: counting a number of slots where the SCI is decoded; and determining that the one or more signals satisfy the set of sidelink metrics until a slot number threshold is reached.

Aspect 7 is the method of any of aspects 1-6, wherein determining to continue the LBT timer to run further comprises: determining that the one or more signals are associated with one or more isolated sidelink slots that are not immediately preceded or followed by a sidelink slot over which a sidelink transmission is detected.

Aspect 8 is the method of any of aspects 1-7, wherein determining to allow the LBT timer to continue to run further comprises: determining that one or more consecutive slots associated with the one or more signals last shorter than a duration, wherein determining that the one or more consecutive slots associated with the one or more signals last shorter than the duration is based on SCI associated with the one or more signals.

Aspect 9 is the method of any of aspects 1-8, wherein the one or more signals are associated with a number of channel occupancy times, each channel occupancy time comprising one or more consecutive slots, and wherein determining to allow the LBT timer to continue to run further comprises: determining the number of channel occupancy times is less than a threshold, wherein determining that the number of channel occupancy times is less than the threshold is based on SCI associated with the one or more signals.

Aspect 10 is the method of any of aspects 1-9, further comprising freezing the LBT timer after determining that the one or more signals are not the one or more sidelink signals that satisfy a first set of sidelink metrics and continuing the LBT timer after a duration with a second set of sidelink metrics, wherein the second set of sidelink metrics is based on the one or more signals that are not the one or more sidelink signals that satisfy the first set of sidelink metrics.

Aspect 11 is the method of any of aspects 1-10, further comprising initiating a second LBT sensing procedure with a second set of sidelink metrics.

Aspect 12 is the method of any of aspects 1-11, wherein the second set of sidelink metrics is based on the LBT sensing procedure.

Aspect 13 is an apparatus for wireless communication including at least one processor coupled to a memory and configured to implement a method as in any of aspects 1-12.

Aspect 14 is an apparatus for wireless communication including means for implementing a method as in any of aspects 1-12.

Aspect 15 is a computer-readable medium storing computer executable code, where the code when executed by a processor causes the processor to implement a method as in any of aspects 1-12.

Aspect 16 is a method of wireless communication at a wireless device, comprising: initiating a LBT sidelink sensing procedure including initiating an LBT timer to run for at least a minimum sensing duration in a channel; detecting one or more signals in the channel during the LBT sidelink sensing procedure; and allowing the LBT timer to continue to run based on the one or more signals being one or more sidelink signals.

Aspect 17 is the method of aspect 1, further comprising freezing the LBT timer if the wireless device detects one or more additional signals that are not sidelink signals.

Aspect 18 is the method of any of aspects 16-17, further comprising: continuing the LBT timer after a configured duration.

Aspect 19 is the method of any of aspects 16-18, further comprising: determining that the one or more signals are the one or more sidelink signals based on successfully decoding SCI associated with the one or more signals.

Aspect 20 is the method of any of aspects 16-19, wherein allowing the LBT timer to continue to run is further based on the one or more sidelink signals satisfying a set of sidelink metrics.

Aspect 21 is the method of any of aspects 16-20, wherein allowing the LBT timer to continue further comprises: counting a number of slots where the SCI is decoded; and determining that the one or more signals satisfy the set of sidelink metrics until a slot number threshold is reached.

Aspect 22 is the method of any of aspects 16-21, wherein the wireless device allows the LBT timer to continue further based on the one or more signals being associated with one or more isolated sidelink slots that are not immediately preceded or followed by a sidelink slot over which a sidelink transmission is detected.

Aspect 23 is the method of any of aspects 16-22, wherein the wireless device allows the LBT timer to continue further based on one or more consecutive slots associated with the one or more signals lasting shorter than a duration, the duration being based on the SCI associated with the one or more signals.

Aspect 24 is the method of any of aspects 16-23, wherein the one or more signals are associated with a number of channel occupancy times, each channel occupancy time comprising one or more consecutive slots, and wherein the wireless device allows the LBT timer to continue further based on the number of channel occupancy times being less than a threshold based on the SCI associated with the one or more signals.

Aspect 25 is the method of any of aspects 16-24, further comprising freezing the LBT timer after determining that the one or more signals are not the one or more sidelink signals that satisfy a first set of sidelink metrics and continuing the LBT timer after a duration with a second set of sidelink metrics, wherein the second set of sidelink metrics is based on the one or more signals that are not the one or more sidelink signals that satisfy the first set of sidelink metrics.

Aspect 26 is the method of any of aspects 16-25, further comprising: initiating a second LBT sidelink sensing procedure with a second set of sidelink metrics.

Aspect 27 is the method of any of aspects 16-26, wherein the second set of sidelink metrics is based on the LBT sidelink sensing procedure.

Aspect 28 is an apparatus for wireless communication including at least one processor coupled to a memory and configured to implement a method as in any of aspects 16-27.

Aspect 29 is an apparatus for wireless communication including means for implementing a method as in any of aspects 16-27.

Aspect 30 is a computer-readable medium storing computer executable code, where the code when executed by a processor causes the processor to implement a method as in any of aspects 16-27.

What is claimed is:

1. A method of wireless communication at a wireless device, comprising:
   initiating a listen before talk (LBT) sidelink sensing procedure including initiating an LBT timer to run for at least a minimum sensing duration in a channel;
   detecting one or more signals in the channel during the LBT sidelink sensing procedure; and
   allowing the LBT timer to continue to run based on the one or more signals being one or more sidelink signals.

2. The method of claim 1, further comprising freezing the LBT timer if the wireless device detects one or more additional signals that are not sidelink signals.

3. The method of claim 2, further comprising:
   continuing the LBT timer after a configured duration.

4. The method of claim 1, further comprising: determining that the one or more signals are the one or more sidelink signals based on successfully decoding sidelink control information (SCI) associated with the one or more signals.

5. The method of claim 4, wherein allowing the LBT timer to continue to run is further based on the one or more sidelink signals satisfying a set of sidelink metrics.

6. The method of claim 5, wherein allowing the LBT timer to continue further comprises:
   counting a number of slots where the SCI is decoded; and
   determining that the one or more signals satisfy the set of sidelink metrics until a slot number threshold is reached.

7. The method of claim 5, wherein the wireless device allows the LBT timer to continue further based on the one or more signals being associated with one or more isolated sidelink slots that are not immediately preceded or followed by a sidelink slot over which a sidelink transmission is detected.

8. The method of claim 5, wherein the wireless device allows the LBT timer to continue further based on one or more consecutive slots associated with the one or more signals lasting shorter than a duration, the duration being based on the SCI associated with the one or more signals.

9. The method of claim 5, wherein the one or more signals are associated with a number of channel occupancy times, each channel occupancy time comprising one or more consecutive slots, and wherein the wireless device allows the LBT timer to continue further based on the number of channel occupancy times being less than a threshold based on the SCI associated with the one or more signals.

10. The method of claim 5, further comprising freezing the LBT timer after determining that the one or more signals are not the one or more sidelink signals that satisfy a first set of sidelink metrics and continuing the LBT timer after a duration with a second set of sidelink metrics, wherein the second set of sidelink metrics is based on the one or more signals that are not the one or more sidelink signals that satisfy the first set of side link metrics.

11. The method of claim 1, further comprising:
initiating a second LBT sidelink sensing procedure with a second set of side link metrics.

12. The method of claim 11, wherein the second set of sidelink metrics is based on the LBT sidelink sensing procedure.

13. An apparatus for wireless communication at a wireless device, comprising:
a memory; and
at least one processor coupled to the memory and configured to:
initiate a listen before talk (LBT) sidelink sensing procedure including initiation of an LBT timer to run for at least a minimum sensing duration in a channel;
detect one or more signals in the channel during the LBT sidelink sensing procedure; and
allow the LBT timer to continue to run based on the one or more signals being one or more sidelink signals.

14. The apparatus of claim 13, wherein the at least one processor coupled to the memory is further configured to: freeze the LBT timer if the wireless device detects one or more additional signals that are not sidelink signals.

15. The apparatus of claim 14, wherein the at least one processor coupled to the memory is further configured to: continue the LBT timer after a configured duration.

16. The apparatus of claim 13, wherein the at least one processor coupled to the memory is further configured to: determine that the one or more signals are the one or more sidelink signals based on successfully decoding sidelink control information (SCI) associated with the one or more signals.

17. The apparatus of claim 16, wherein the at least one processor is configured to allow the LBT timer to continue to run further based on the one or more sidelink signals satisfying a set of sidelink metrics.

18. The apparatus of claim 17, wherein to allow the LBT timer to continue, the at least one processor is further configured to:
count a number of slots where the SCI is decoded; and
determine that the one or more signals satisfy the set of sidelink metrics until a slot number threshold is reached.

19. The apparatus of claim 17, wherein the at least one processor is configured to allow the LBT timer to continue further based on the one or more signals being associated with one or more isolated sidelink slots that are not immediately preceded or followed by a sidelink slot over which a sidelink transmission is detected.

20. The apparatus of claim 17, wherein the at least one processor is configured to allow the LBT timer to continue further based on one or more consecutive slots associated with the one or more signals lasting shorter than a duration, based on the SCI associated with the one or more signals.

21. The apparatus of claim 17, wherein the one or more signals are associated with a number of channel occupancy times, each channel occupancy time comprising one or more consecutive slots, and wherein the at least one processor is configured to allow the LBT timer to continue further based on the number of channel occupancy times being less than a threshold, as indicated in the SCI associated with the one or more signals.

22. The apparatus of claim 17, wherein the at least one processor coupled to the memory is further configured to:
freeze the LBT timer if the one or more signals are not the one or more sidelink signals that satisfy a first set of sidelink metrics and continue the LBT timer after a duration with a second set of sidelink metrics, wherein the second set of sidelink metrics is based on the one or more signals that are not the one or more sidelink signals that satisfy the first set of sidelink metrics.

23. The apparatus of claim 13, wherein the at least one processor coupled to the memory is further configured to:
initiate a second LBT sidelink sensing procedure with a second set of side link metrics.

24. The apparatus of claim 23, wherein the second set of sidelink metrics is based on the LBT sidelink sensing procedure.

25. The apparatus of claim 24, wherein the at least one processor is further configured to:
continue the LBT timer after a configured duration.

26. The apparatus of claim 13, further comprising a transceiver coupled to the at least one processor.

27. An apparatus for wireless communication at a wireless device, comprising:
means for initiating a listen before talk (LBT) sidelink sensing procedure including initiating an LBT timer to run for at least a minimum sensing duration in a channel;
means for detecting one or more signals in the channel during the LBT sidelink sensing procedure; and
means for allowing the LBT timer to continue to run.

28. The apparatus of claim 27, further comprising: freezing the LBT timer if the wireless device detects one or more additional signals that are not sidelink signals.

29. The apparatus of claim 27, further comprising a transceiver.

30. A computer-readable medium storing computer executable code at a wireless device, the code when executed by a processor cause the processor to:
initiate a listen before talk (LBT) sidelink sensing procedure including initiating an LBT timer to run for at least a minimum sensing duration in a channel;

detect one or more signals in the channel during the LBT sidelink sensing procedure; and allow the LBT timer to continue to run.

\* \* \* \* \*